Jan. 9, 1968          E. K. HANSEN          3,362,683

AUTOMOTIVE HYDRAULIC JACK ASSEMBLY FOR VEHICLES

Filed Jan. 16, 1967          3 Sheets-Sheet 1

INVENTOR
ELMER K. HANSEN

BY *Rudolph L. Lavell*

ATTORNEY

Jan. 9, 1968  E. K. HANSEN  3,362,683
AUTOMOTIVE HYDRAULIC JACK ASSEMBLY FOR VEHICLES
Filed Jan. 16, 1967  3 Sheets-Sheet 2
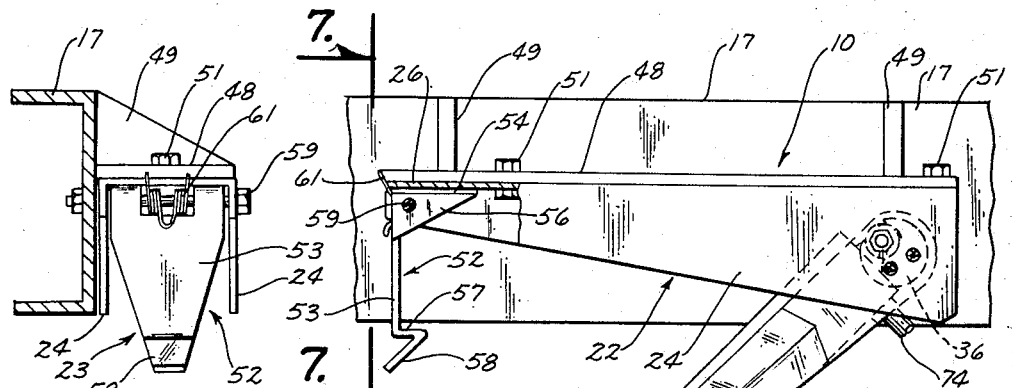
Fig. 7
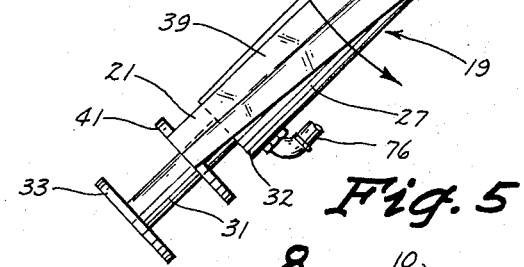
Fig. 5
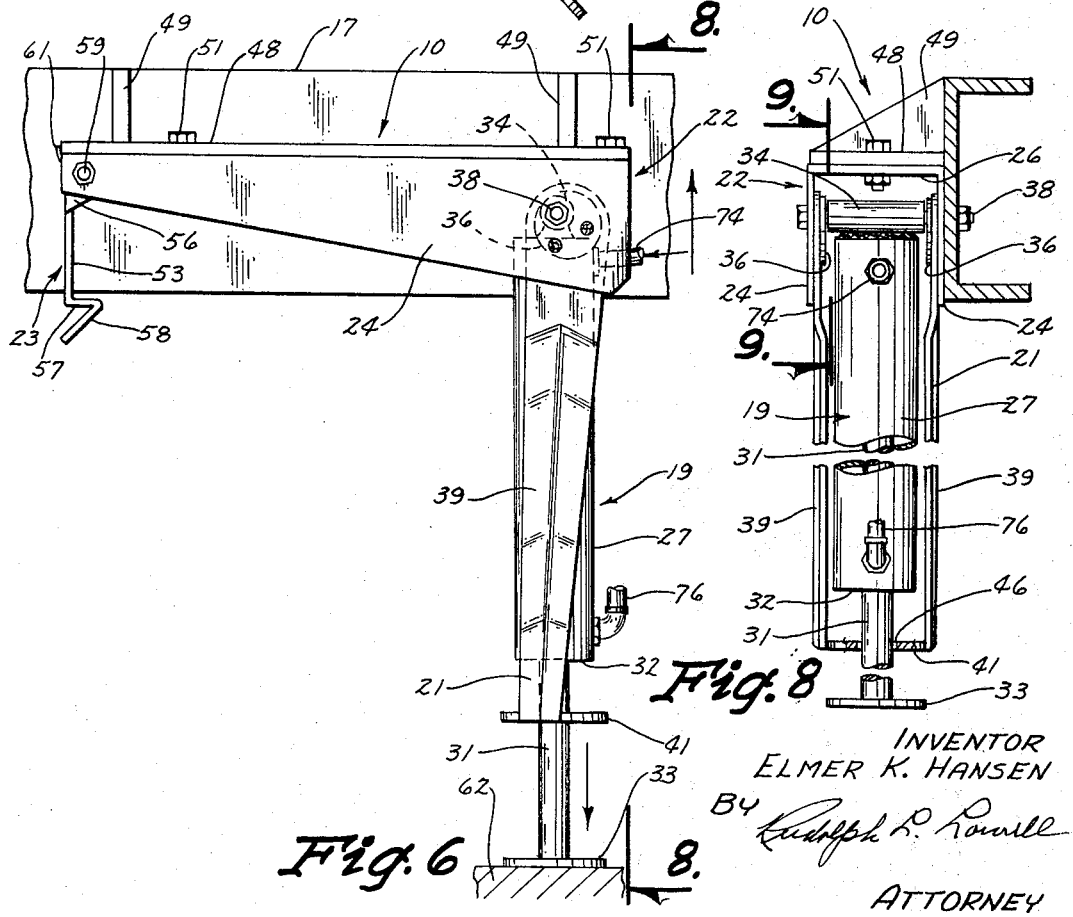
Fig. 8
Fig. 6
INVENTOR
ELMER K. HANSEN
BY
ATTORNEY Jan. 9, 1968  E. K. HANSEN  3,362,683
AUTOMOTIVE HYDRAULIC JACK ASSEMBLY FOR VEHICLES
Filed Jan. 16, 1967  3 Sheets-Sheet 3
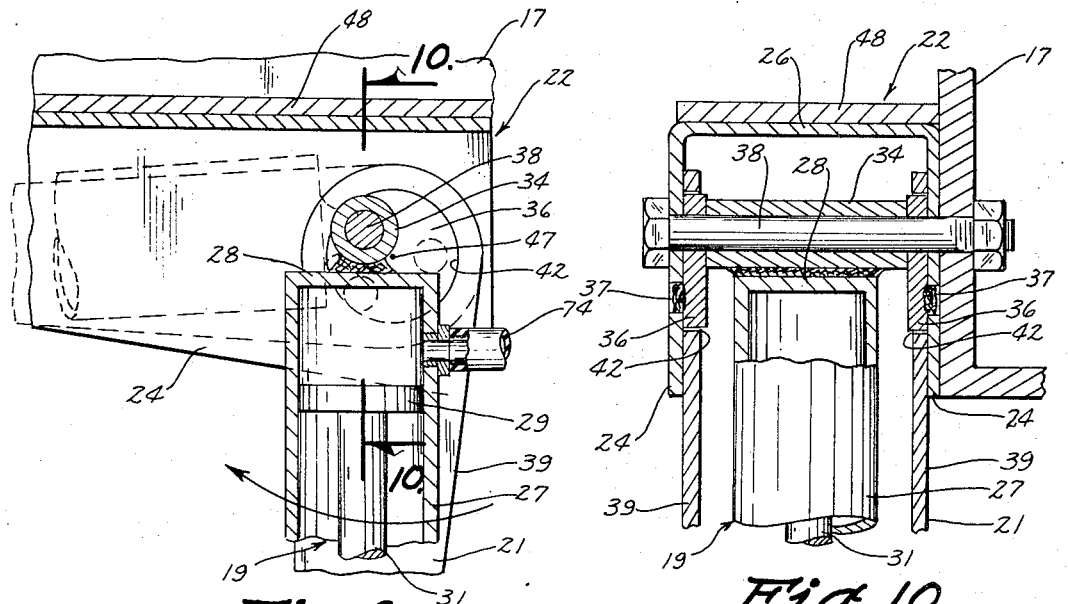
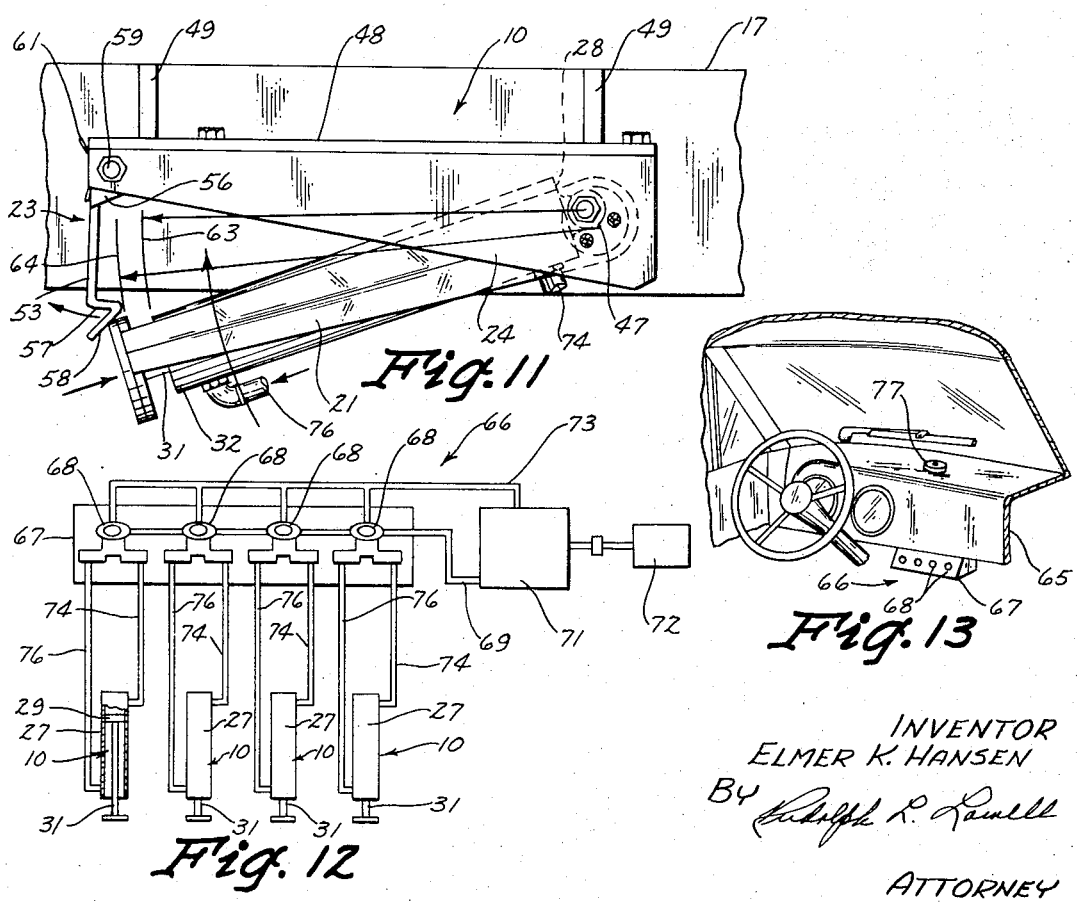
INVENTOR
ELMER K. HANSEN
BY
ATTORNEY United States Patent Office 3,362,683
Patented Jan. 9, 1968

3,362,683
AUTOMOTIVE HYDRAULIC JACK ASSEMBLY
FOR VEHICLES
Elmer K. Hansen, 801 S. Martha St.,
Sioux City, Iowa 51106
Filed Jan. 16, 1967, Ser. No. 609,650
5 Claims. (Cl. 254—86)

ABSTRACT OF THE DISCLOSURE

A hydraulic jack assembly is pivotally supported on a vehicle frame adjacent each of the four wheels of the vehicle. Each jack assembly includes a pivoted piston and cylinder unit assembled with a torque arm that is eccentrically mounted relative to the pivot axis of the piston and cylinder unit and arranged to counteract the retractable movement of the piston to automatically provide for the movement of the piston and cylinder unit to a horizontal storage position, when the piston is retracted, and to a vertical operative position for ground engagement when the piston is extended. The cylinder and piston units are individually and manually operated from within the vehicle to extended positions for horizontally levelling the vehicle frame, with the level position of the frame being determined by a level gauge carried within the vehicle.

Summary of the invention

The invention provides for the horizontal levelling of the frame of a four-wheel vehicle by hydraulic jack assemblies controlled entirely from within the vehicle and operable to horizontally level the vehicle frame while maintaining the vehicle wheels in ground engagement to stabilize the frame in a level position therefor.

Detailed description of the invention

This invention relates to hydraulic jacks and in particular to a hydraulic jack assembly which is carried on a vehicle frame and is automatically actuated in response to fluid pressure for movement to a horizontal storage position and to an operative vertical position.

The jack assembly of this invention is applicable to general vehicular use where it is desired to elevate the vehicle frame relative to the vehicle ground engaging wheels. However, it is particularly adaptable to four-wheeled mobile home vehicles whether of the self-propelled or towed type. As is well known, these units are equipped with various kitchen appliances and sleeping facilities. The appliances are most efficient when operated at level positions therefor. Likewise maximum sleeping comfort is obtained when the beds or cots used for sleeping are horizontally level.

When these mobile vehicles are used for living purposes the parking areas generally available may have uneven or inclined ground surfaces. By the use of a plurality of the jack assemblies of this invention, one of which is carried on the vehicle frame at a position adjacent each vehicle wheel, the vehicle frame is easily and quickly adjusted to a horizontally level position by the operator from within the vehicle.

It is an object of this invention therefore to provide an improved vehicular hydraulic jack assembly.

A further object of this invention is to provide a hydraulic jack assembly which is permanently attachable to a vehicle frame and operable from within the vehicle for movement automatically to a horizontal storage or transport position and to a vertical operating position.

Another object of this invention is to provide a hydraulic jack assembly for attachment to a vehicle frame and actuated by fluid pressure to operative and storage positions therefore, which is of a compact construction, easily installed on all types of vehicles and automatically locked into and released from its storage position in response to the movement thereof into and out of such position.

Still a further object of this invention is to provide a hydraulic jack assembly that is permanently attachable to a vehicle frame and operable from within the vehicle, wherein a torque arm pivotally supported for eccentric movement relative to the pivot for a hydraulic cylinder and piston unit and arranged for engagement by the piston, on retraction thereof, to move the jack assembly to a horizontal storage position and, on extension of the piston, is movable with the cylinder and piston unit to a vertical operative position by the action of gravity.

Further objects, features and advantages of this invention will become apparent from the following description when taken in connection with the accompanying drawings wherein:

FIG. 5 is illustrated similar to FIG. 3 and shows the hydraulic jack assembly in a position midway between the storage and operative positions therefor;

FIG. 6 is illustrated similar to FIG. 3 and shows the jack assembly in its operative vertical position;

FIG. 7 is a detail sectional view taken along the line 7—7 in FIG. 5 showing the releasable locking means for holding the jack assembly in a storage position;

FIG. 8 is a foreshortened side elevational view of a jack assembly as seen along the line 8—8 in FIG. 6;

FIG. 9 is a detailed sectional view as seen on the line 9—9 in FIG. 8;

FIG. 10 is a sectional view taken along the line 10—10 in FIG. 9;

FIG. 11 is illustrated similar to FIG. 3 and shows the relative arrangement of the jack assembly with the locking means as the jack approaches a storage position;

FIG. 12 is a schematic showing of the oil operating system for the hydraulic jack assembly; and FIG. 13 is a schematic showing of the vehicle instrument panel illustrating the assembly therewith of a valve control mechanism what forms part of the oil operating system.

Figure 1:
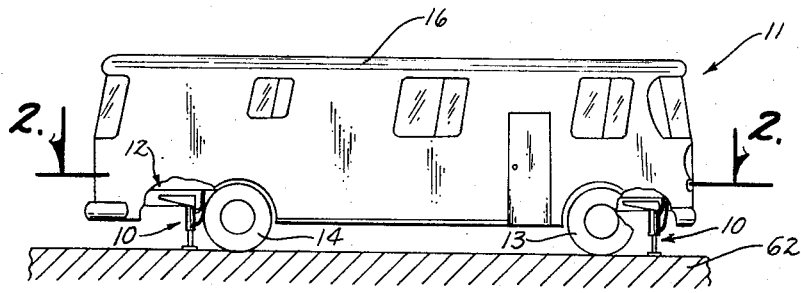
FIG. 1 is a side elevational view of a self-propelled mobile home vehicle showing the arrangement therewith of the hydraulic jack assembly of this invention.
Figures 2, 3:
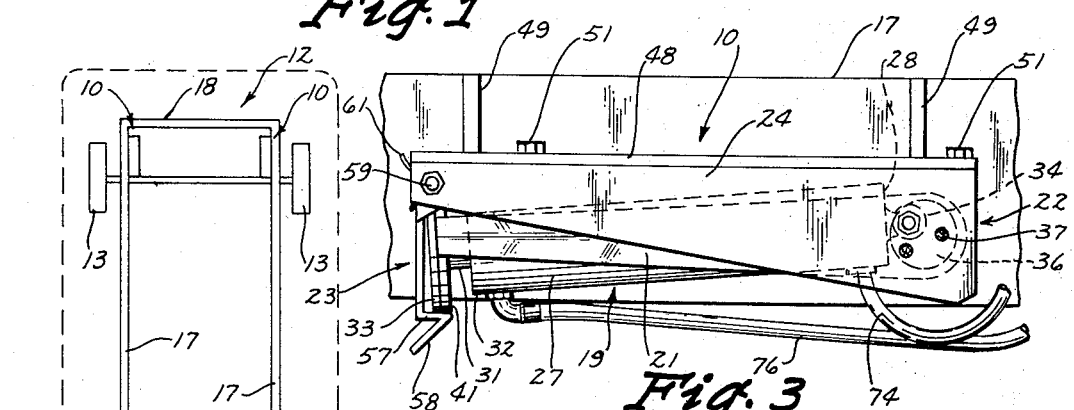
FIG. 2 is a plan view of the vehicle frame taken substantially along the line 2—2 in FIG. 1 showing the location of the hydraulic jack assemblies relative to the vehicle frame and wheels.
FIG. 3 is an enlarged side elevational view of the hydraulic jack assembly shown in a storage or transport position relative to the vehicle frame.

With reference to FIGS. 1 and 2 of the drawings the hydraulic jack assembly of this invention, indicated generally as 10, is illustrated relative to a usual self-propelled mobile home vehicle 11 having a main frame 12, front steering wheels 13, rear traction wheels 14, and a body 16. The main frame 12 includes longitudinally extended channel frame members 17 connected together by transverse frame members 18. As illustrated, a jack assembly 10 is secured to a frame member 17 adjacent each of the vehicle wheels with the front jack assemblies 10 arranged forwardly of the steering wheels 13 and the rear jack assemblies positioned behind the traction wheels 14. Since each jack assembly 10 is similar in construction and operation only one thereof will be described in detail in the following description, with like parts being designated by like numerals.

A jack assembly 10 (FIGS. 3 and 4) includes a double acting hydraulic cylinder unit 19, a torque arm 21, a housing support 22 and a locking mechanism 23 for holding the cylinder unit 19 and torque arm 21 in a storage or transport position within the housing 22.

The housing 22 is of an inverted channel shape in transverse cross section having side legs 24 and a base or top wall 26, with the legs 24 being inclined in a direction downwardly and away from the locking mechanism 23.

The cylinder unit 19 includes a cylinder 27, closed at one end 28, associated with a piston 29 (FIG. 9) equipped with a piston rod 31 which is extended and retracted relative to the opposite or open end 32 of the cylinder 27. A ground engaging plate member 33 of a disc shape is attached to the terminal or free end of the piston rod 31.

Secured to the closed cylinder end 28 (FIGS. 9 and 10) is a tubular bearing 34. A pair of transversely opposite cylindrical bearing members 36 are attached, by weldments 37, to the inner side of corresponding legs 24 of the housing 22 at the ends thereof opposite the locking mechanism 23. The bearing members 36 and the legs 24 are formed with axial aligned openings.

With the closed cylinder end 28 disposed between the bearing members 36 a bolt or shaft 38 is inserted through the leg and bearing member openings and through the tubular bearing 34 to pivotally support the cylinder unit 19 for pivotal movement longitudinally of the housing 22.

The torque arm 21 (FIG. 8) is of an elongated U-shape having leg sections 39 and a base of laterally projected section 41. The leg sections 39 are of a greater length than the cylinder 27 and are spaced a distance apart to receive the cylinder therebetween. The free ends of the leg sections 39 are formed with axial aligned openings 42 (FIG. 9) of a size to receive a cylinder bearing member 36. The side walls of the openings 42 thus constitute bearing surfaces for pivotally supporting the torque arm 21 on the cylindrical bearing members 36. The base section 41 of the torque arm 21 is positioned between the piston rod plate member 33 and the open end 32 of the cylinder 27 and is formed with an opening 46 to slideably receive the piston rod 31.

As clearly appears in FIG. 9 the axial center of the cylindrical bearing members 36, indicated at 47, is offset relative to the axis of the pivot shaft 38. The torque arm 21 is thus supported for eccentric pivotal movement relative to the pivot of the cylinder unit 19.

In the assembly of the jack assembly 10 with the vehicle frame 12 a mounting plate 48 (FIGS. 5 and 7) having upstanding gusset members 49 is secured, as by bolts or weldments, to the outer side of a frame side member 17 so as to extend longitudinally of the frame member in a horizontal plane. The base 26 of the housing 22 is positioned against the underside of the mounting plate 48 with the inner leg 24 of the housing bearing against the outer side of a frame side member 17. The housing base section 26 is secured to the plate member 48 by bolt assemblies 51. The pivot shaft or bolt 38 for the cylinder unit 19 may be extended through the frame member 17 to additionally fix the housing 22 on the frame member.

In operation assume the jack assembly 10 to be in its storage position shown in FIG. 3 wherein the torque arm 21 and the cylinder unit 19 with the piston rod 31 retracted are within the housing 22 and held against downward pivotal movement by the locking mechanism 23.

As shown in FIGS. 5 and 7, the locking mechanism 23 includes a body member 52 of a right angle shape having a depending catch section 53, a horizontally extended stop section 54 and connecting side sections 56. The lower end of the catch section 53 is integrally formed with an inwardly and laterally extended catch or shoulder member 57 which terminates in a downwardly and outwardly inclined cam member 58. A pivot shaft or bolt 59 extended through the side sections 56 and the legs 24 of the housing 22 supports the body member 52 for pivotal movement of the catch section 53 from a position away from the cylinder unit 19 to a vertically dependent position defined by the abutting engagement of the stop section 54 with the underside of the housing base section 26. A torsion spring 61 biases the catch section 53 to its vertical stop position wherein the piston rod plate member 33 is supported on the catch member 57 as shown in FIG. 3.

Figure 4:
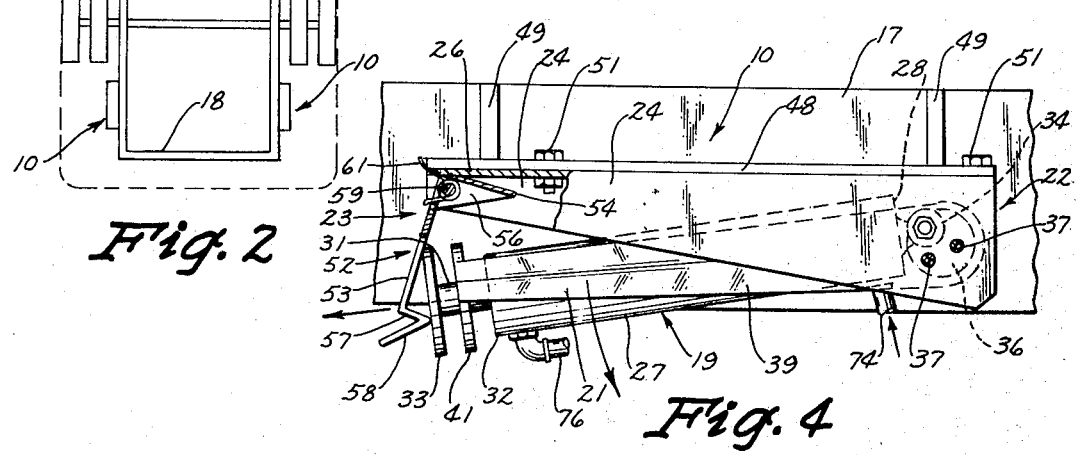
FIG. 4 is illustrated similar to FIG. 3 and shows the released position of a locking means for holding the hydraulic jack assembly in a storage position.

On the supplying of fluid under pressure at the closed end 28 of the cylinder 27, to extend the piston rod 31 (FIG. 3), the catch section 53 is engaged by the piston rod plate member 33 and pivotally moved in the direction of the piston rod movement until the plate member 33 is moved from its supported position on the catch member 57 as shown in FIG. 4. On release of the plate member 33 from the catch member 57, the cylinder unit 19 and the torque arm 21 are freely swingable as a unit away from the catch member 57, as shown in FIG. 5, to their vertically depending positions in FIG. 6. On a continued extension of the piston rod 31 the plate member 33 is engageable with the ground surface 62 to provide for the lifting of the vehicle frame 12.

On retraction of the piston rod 31 from its ground engaging position shown in FIG. 6, the cylinder unit 19 and torque arm 21 remain vertically positioned until the plate member 33 engages the base or lateral section 41 of the torque arm. After this engagement occurs the cylinder unit 19 and the torque arm 21, by virtue of the eccentric mounting of the torque arm relative to the pivot axis of the cylinder 27 and the resultant moment arm defined by the distance between their respective pivotal axes, are automatically swung upwardly to their storage position in FIG. 3.

As this storage position is approached, the plate member 33 engages the cam member 58 and pivotally moves the catch section 53 outwardly against the action of the torsion spring 61 until the catch member 57 is disposed below the plate member 33. The catch member 57 is then moved inwardly by the torsion spring 61 to its position underlying the plate member 33. On release of fluid pressure to the cylinder 27, the cylinder unit 19 and torque arm 21 are locked by the catch member 57 against downward movement.

In the upward movement of the cylinder unit 19 to a horizontally extended storage position, it is to be noted that the arcuate paths indicated at 63 and 64 (FIG. 11) for the free ends of the cylinder 27 and torque arm 21, respectively, are spaced apart and that the arcuate path of the cylinder 27 approaches the arcuate path of the torque arm 21. During this upward movement, therefore, the cylinder 27 moves outwardly relative to the piston rod 31, the inward movement of which is restrained by the torque arm 21. This relative movement is permitted to take place as a result of the eccentric mounting of the torque arm relative to the cylinder 27.

In one embodiment of the invention the pivot axis of the cylinder unit 19 is offset 45 degrees upwardly from a horizontal plane extended through the pivot axis of the torque arm 21. In this embodiment, the free end of the cylinder 27 rotates on a radius of fifteen inches and the free end of the torque arm 21 on a radius of fifteen and one-half inches.

For the purpose of horizontally levelling the vehicle frame 12, when the vehicle 11 is parked on an uneven or sloped ground surface, the jack assemblies 10 (FIG. 12) are independently operated from a control mechanism 66 which, as shown in FIG. 13, may be suitably carried on the vehicle instrument panel 65 for convenient access by the vehicle operator.

The control mechanism 66 (FIG. 12) includes a box 67 having four manual control valves 68 corresponding in number to the jack assemblies 10. A fluid pressure inlet line 69 for the control mechanism 66 is connected to the outlet of a pump unit 71 provided on the vehicle 11 and driven from the vehicle engine 72. Fluid is exhausted from the control mechanism 66 through a line 73 connected to the inlet of the pump unit 71.

Each valve 68 is of a type moveable to two positions from a neutral position. A first position provides for the supply of fluid under pressure through a line 74 to the cylinder 27 at the top side of the piston 29, to extend the piston rod 31, concurrently with the exhaust of fluid from the underside of the piston through a line 76 to the line 73. The second position of a control valve 68 provides for the supply of fluid under pressure to the cylinder 27 through the line 76 to retract the piston rod 31 concurrently with the exhaust of fluid through the line 74 to the line 73.

The actuation of the control valves 68 to extend the piston rods 31 for the purpose of horizontally levelling the vehicle frame 12 is determined by a usual bubble gauge 77 that is carried on the instrument panel 65. The valves 68 are independently actuated until the horizontal level position of the frame 12 is obtained. In this levelling operation, it is to be understood that the frame 12 will be raised relative to the vehicle wheels through the usual suspension action of the vehicle springs (not shown). As a result when the frame 12 is horizontally level the vehicle wheels will remain supported on the ground surface 62 so as to stabilize the support of the vehicle 11 on the jack assemblies 10. In the event it is desired to elevate a wheel above the ground surface for removal purposes, it is only necessary to lock the axle of the wheel to be removed with the frame 12, to eliminate the spring action therebetween, and then operate only the jack assembly 10 which corresponds to such wheel.

It is also to be noted, as best appears in FIG. 1, that a jack assembly 10 is pivoted rearwardly from a vertical operative position to a horizontal storage position. As a result should the vehicle 11 be moved forwardly, while the jack assemblies 10 are inadvertently in their operative positions, the jack assemblies will merely pivot rearwardly without being damaged.

Although the invention has been described with respect to a preferred embodiment thereof, it is to be understood that it is not to be so limited since changes can be made therein which are within the full intended scope of this invention as defined by the appended claims.

I claim:

1. A hydraulic jack assembly for use with a vehicle to raise the vehicle frame from a supported position on a ground engaging wheel of the vehicle comprising:
   (a) a cylinder and associated reciprocable piston, said cylinder closed at one end and said piston being extendable and retractable relative to the other end thereof,
   (b) a torque arm extended longitudinally of said cylinder having a laterally extended portion at one end thereof, said piston extended through and slideably movable relative to said portion,
   (c) a ground engaging plate member secured to said piston outwardly from said laterally extended portion,
   (d) first pivot means supporting the cylinder at the closed end thereof on said vehicle frame adjacent said ground engaging wheel for pivotal movement of the cylinder about an axis extended transversely of the vehicle, and
   (e) second pivot means mounting the other end of said torque arm on said vehicle frame for eccentric movement of the torque arm relative to said transverse axis,
   (f) said piston plate member, on retraction of the piston, being engageable with said lateral portion to move the jack assembly to a horizontal position, and on extension of the piston being movable out of engagement with said lateral portion to provide for the gravity movement of the jack assembly to a vertical position.

2. The hydraulic jack assembly according to claim 1, wherein:
   (a) said second pivot means comprises a cylindrical bearing member secured to the vehicle frame with the axis thereof offset from said transverse axis, and
   (b) a bearing member at the other end of said torque arm for receiving said bearing member to pivotally support the torque arm thereon.

3. The hydraulic jack assembly according to claim 1, wherein:
   (a) said torque arm is of a U-shape having leg sections connected together at the one end of the torque arm by said lateral portion, with said cylinder positioned between said leg sections.

4. The hydraulic jack assembly according to claim 1, wherein:
   (a) the vehicle frame has a pair of transversely spaced ground engaging wheels adjacent each end thereof, has four ground wheels,
   (b) a jack assembly corresponding to each wheel,
   (c) means for individually controlling the extension and retraction of the piston for each jack assembly relative to an associated cylinder to provide a horizontally level position of the vehicle frame, and
   (d) means for indicating a horizontally level position of the vehicle frame.

5. A hydraulic jack assembly for horizontally levelling the main frame of a vehicle having pairs of transversely spaced ground engaging wheels at each end thereof comprising:
   (a) a plurality of hydraulic jack assemblies corresponding to said wheels, each jack assembly including a cylinder and associated reciprocable piston,
   (b) a torque arm for each jack assembly of a substantially U-shape having leg sections and a base section and of a size to receive a corresponding cylinder between the leg sections thereof with the piston therefor extended through and slideable relative to the base section,
   (c) a plate member fixed to the outer end of each piston,
   (d) a first pivot means supporting and end of each cylinder on the vehicle frame adjacent to a corresponding ground engaging wheel for pivotal movement of the cylinder about a fixed axis extended transversely of the vehicle, and
   (e) a second pivot means supporting the free ends of the leg sections of each torque arm on the vehicle frame for eccentric movement of the torque arm relative to a corresponding cylinder axis,
   (f) with a piston plate member being engageable with the base section of a corresponding torque arm, on retraction of a piston to move a jack assembly to a horizontal position, and a jack assembly on extension of the piston out of engagement with the base section being movable by gravity to a vertical position.

References Cited

UNITED STATES PATENTS

| | | | |
|---|---|---|---|
| 1,988,304 | 1/1935 | Duman | 254—86 |
| 2,837,312 | 6/1958 | Troche | 254—86 |
| 3,182,957 | 5/1965 | Dalton | 254—86 |

OTHELL M. SIMPSON, *Primary Examiner.*